United States Patent [19]

Drillick

[11] 3,757,684

[45] Sept. 11, 1973

[54] HIGH SPEED AUTOMATIC CARD EMBOSSER

[75] Inventor: Jacob H. Drillick, Hackensack, N.J.

[73] Assignee: Data Card Corporation, St. Paul, Minn.

[22] Filed: Dec. 13, 1971

[21] Appl. No.: 207,504

Related U.S. Application Data

[60] Division of Ser. No. 57,960, July 24, 1970, Pat. No. 3,638,563, Continuation-in-part of Ser. Nos. 769,245, Oct. 21, 1968, abandoned, and Ser. No. 861,432, Sept. 26, 1969, abandoned.

[52] U.S. Cl. .................................................. 101/18
[51] Int. Cl. .................................................. B41j 7/40
[58] Field of Search .................. 101/18, 19, 20, 932

[56] References Cited

UNITED STATES PATENTS

| | | | |
|---|---|---|---|
| 1,789,831 | 1/1931 | Pannier et al. | 101/18 |
| 1,820,760 | 8/1931 | Pannier et al. | 101/18 |
| 2,596,721 | 5/1952 | Pentecost et al. | 101/18 |
| 2,890,651 | 6/1959 | Hosken | 101/19 X |

*Primary Examiner*—William B. Penn
*Attorney*—Morton, Bernard, Brown, Roberts & Sutherland

[57] ABSTRACT

A machine for embossing credit cards having data reading means, a computer controlling selectively operable embossing punches corresponding to each character, and indexing means for moving the card past each embossing punch.

1 Claim, 18 Drawing Figures

Patented Sept. 11, 1973 3,757,684

11 Sheets-Sheet 2

Patented Sept. 11, 1973 3,757,684

11 Sheets-Sheet 7

Patented Sept. 11, 1973 3,757,684

11 Sheets-Sheet 10

HIGH SPEED AUTOMATIC CARD EMBOSSER

CROSS-REFERENCE TO RELATED APPLICATIONS

This is a division of application Ser. No. 57,960, filed July 24, 1970 now U.S. Pat. No. 3,638,563, which is a continuation-in-part and claims the priority of my two earlier filed U.S. Pat. applications, Ser. No. 769,245, filed Oct. 21, 1968, now abandoned, and Ser. No. 861,432, filed Sept. 26, 1969, now abandoned, both entitled "High Speed Automatic Card Embosser".

BACKGROUND OF THE INVENTION

This invention relates the apparatus for automatically embossing type characters onto plastic cards. The data to be embossed on the plastic card is usually contained in a magnetic tape or other data handling media such as paper tape or punched cards. This apparatus would extract the data from the magnetic tape and control a high speed card embosser and emboss the characters onto plastic cards such as credit cards or identity cards and the like.

Heretofore, high speed embossing machines have involved the positioning of a plurality of male and female embossing wheels simultaneously to their selected characters after which all wheels are moved to close upon the plastic card. One can readily see the complexity and high cost of such equipment. The wheels have to be positioned and then aligned with extreme accuracy.

A primary object of this invention is to eliminate the need for locating and positioning embossing wheels. Instead of wheels, this device makes use of a plurality of male character embossing punches which move short strokes against corresponding female embossing character dies. Selection is accomplished electronically by the use of a computer to control the actuation of the selected character embossing punches, to emboss the characters onto the pre-selected positions of the plastic cards as the card moves past the array of punches and dies.

Another object of the invention is to provide a multiple line automatic embossing machine. Other features and advantages of the invention will become clear upon examination of the following description and drawings.

DESCRIPTION OF THE PREFERRED EMBODIMENT

Figure 1:
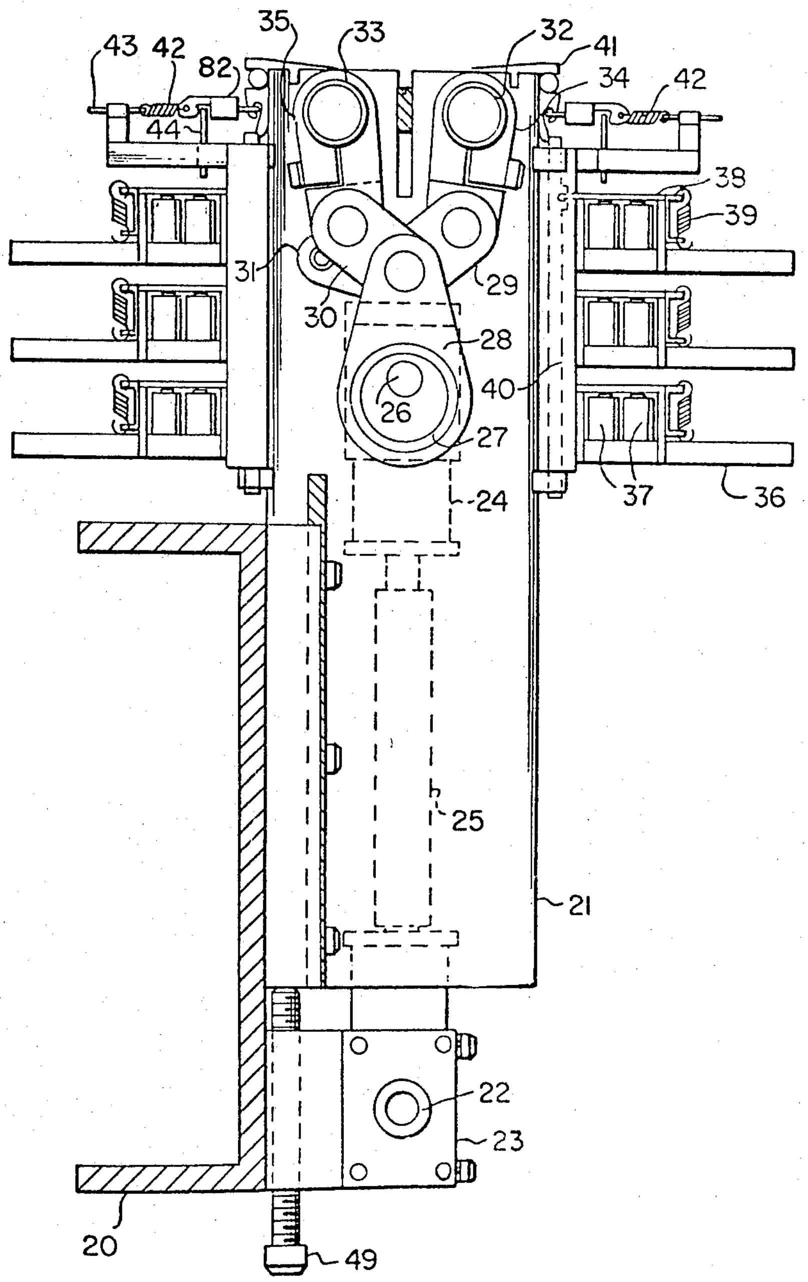
FIG. 1 is an end view of the card embosser in partial section.
Figure 2:
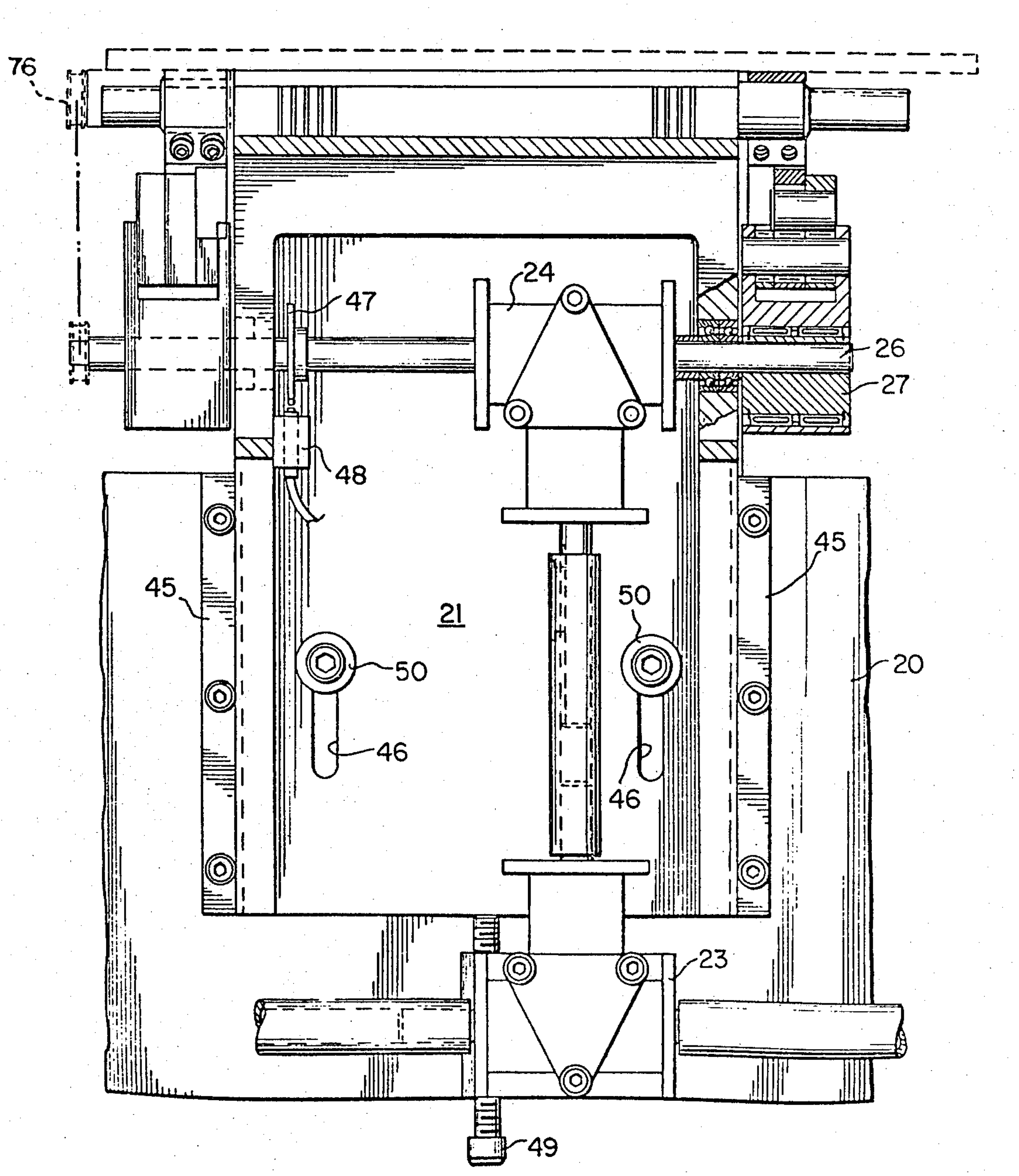
FIG. 2 is a front view of the card embosser in partial section.

As shown in FIGS. 1 and 2 the card embosser is supported on a main support channel 20 to which is attached a vertically movable station housing 21. The height of the station housing is adjusted by adjusting jack screw 49 and held in position by housing clamp bolts 50.

At the bottom of the main support channel, and passing from station to station is horizontal main drive shaft 22. At each station the main drive shaft passes through lower gear box 23 which drives upper gear box 24 terough vertical coupling sleeve 25. The upper gear box drives horizontal station drive shaft 26.

At each station there is a pair of eccentrics 27 which are driven by the drive shaft. Connected to each, and moving vertically, is eccentric arm 28. The upper portion of the eccentric arm is connected, first to drive link 29 for the die; second to drive link 30 for the punch and, third to die dwell control link 31.

Drive link 29 is connected to bail arm 34 which reciprocally rotates bail shaft 32 for the dies. Drive link 30 is connected to bail arm 35 which reciprocally rotates bail shaft 33 for the punches. Die dwell control link 31 is pivotally attached to station housing 21.

Spaced horizontally along the station are a series of cooperating sets of punches and dies, one for each alphabetic or numeric character to be embossed, each set placed in horizontal grooves for reciprocation, and each set supplied with interposers, springs, armatures and related assemblies which will be described initially for one set only of the identical punches and dies.

The card embosser has a common card guide 53 which runs past and through as many card embossing modules as are needed. The cards are fed from a conventional input hopper (not shown) by a mechanism (not shown) such as the one described in my application entitled Card Feed Mechanism Ser. No. 57,960 filed July 24, 1970, into a conventional output hopper (not shown).

Shown in FIG. 1 are six magnet assemblies, three for the punches and three for the dies. As the complete magnet assembly is thicker than the punch and the die which they control, the magnets may conveniently be arranged in staggered relationship as shown. Magnet assembly 36, for one of the dies, has magnet coils 37.

Each magnet assembly has an armature 38 which is pivotally operated and biased upwardly by armature spring 39. Each magnet assembly armature is inserted into a slot of interposer stop 40.

Pivotally operated interposer 41 is biased by interposer spring 42 and hook 82. The machine may also contain electrical switch elements 43 and 44 which make contact when the interposer is activated. The signal is fed to the computer as an error check.

As shown in FIGS. 7 through 11 a card 52 is supported in a card track 53. The interposers are pivoted on common interposer pivot shaft 54. At the lower end of the interposer is the point 55 which is engaged by interposer stop 40, holding the interposer in the elevated position, and opposing the biasing spring 42. The end of the interposer tip 56 cooperates with a bail recess 57 and die tail 58 to operate the die, moving the die, and particularly die cavity 59, against the card to be embossed. A similar grouping of interposers operates each punch 60 to move punch tip 61 against card 52.

Figure 3:
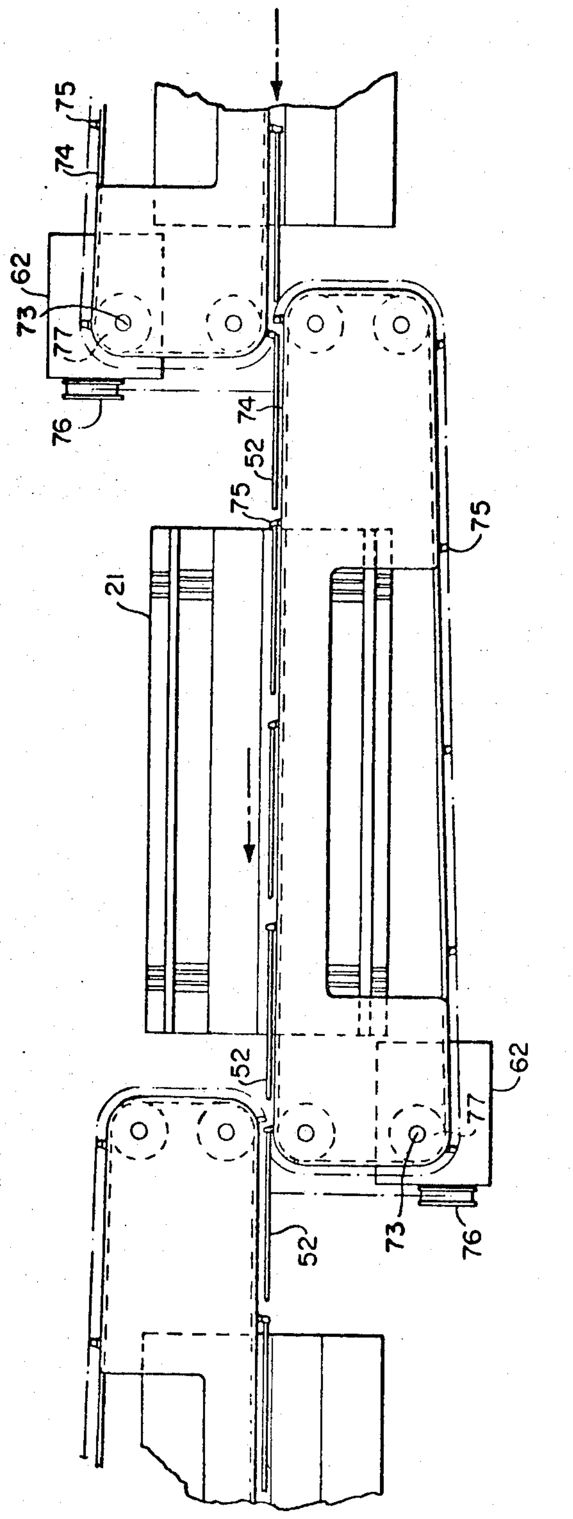
FIG. 3 is a top view of the card indexing mechanisms of adjacent modules.

The movement of the card is controlled by an indexing means including a card indexing gear box 62 containing input shaft 63 connected to a constant speed drive source through input pulley 76. Attached to the input shaft and rotating therewith is worm gear drive collar 66. The drive collar contains a hole 67 in which pin 68 is free to reciprocate. The pin is connected to worm gear barrel cam 65 containing barrel cam groove 71. Cooperating with the groove is barrel cam guide pin 69 and guide pin bearing 70. Below the worm gear barrel cam and attached thereto is worm gear 64 which drives worm wheel 72 which is in turn connected to output shaft 73 journaled into output pulley 77 as shown in FIG. 3. The output pulley drives card index belt 74 with index belt fingers 75.

Figure 4:
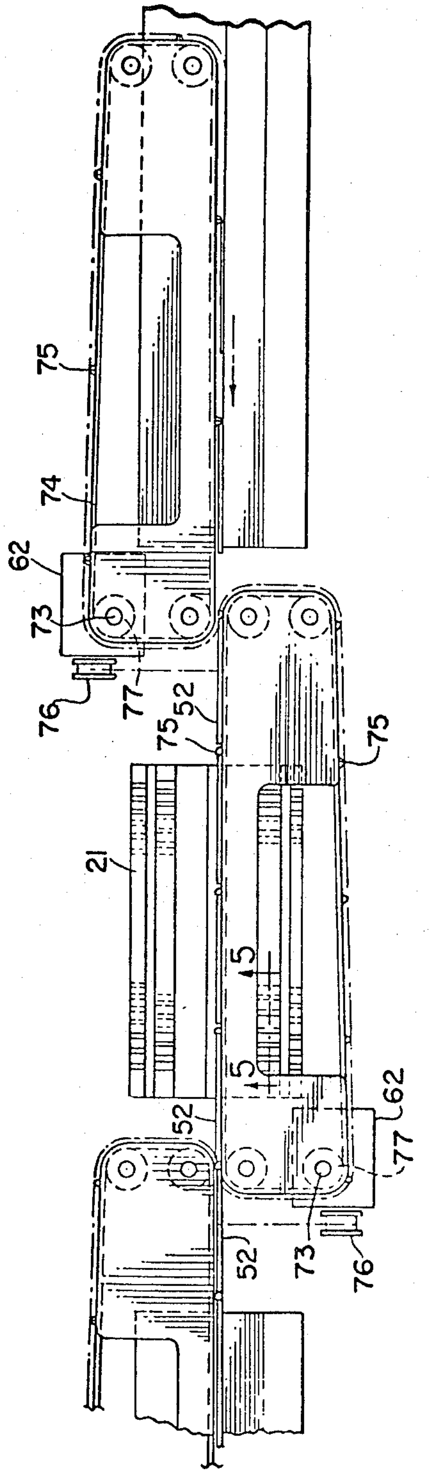
FIG. 4 is a top view similar to FIG. 3 showing adjacent modules adapted to print lines of differing character size and spacing.

When more than one line is embossed adjacent modules are utilized as shown in FIGS. 3 and 4. Each module embosses one line and is set at the proper height relative to common credit card track 53 by adjusting set screw 49. The structure of the modules will vary in two respects depending on the size charcter embossed. This difference will be described for two industry standards, seven and 10 characters to the inch.

Figure 6:
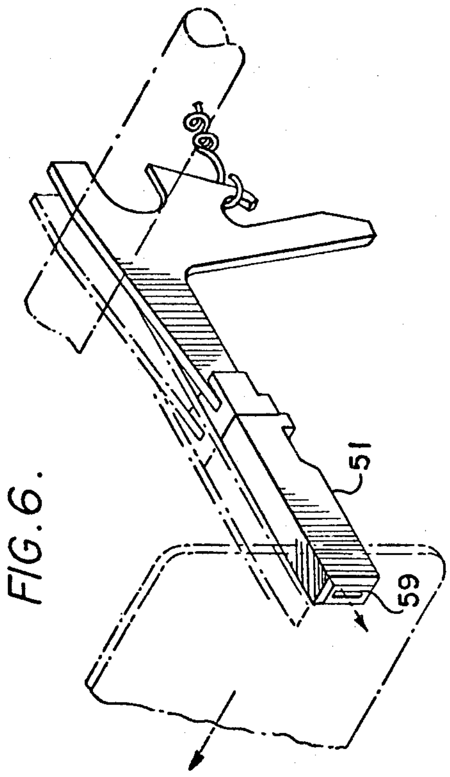
FIG. 6 is a perspective of a single punch and its associated interposer.
Figure 5:
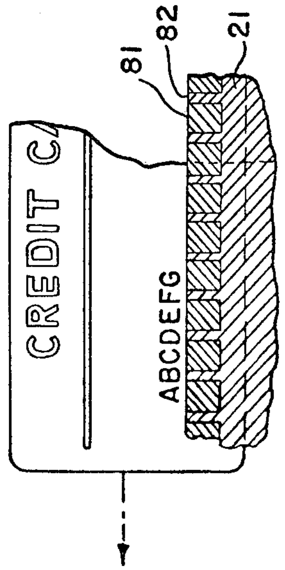
FIG. 5 is a view on lines 5—5 of FIG. 4 showing alignment of adjacent punches exactly twice the distance apart of characters being embossed (shown one line high)

The lateral disposition of pairs of punches and dies is shown in FIGS. 2, 3 and 4 as well as in cross section in FIG. 5 and in FIG. 6. The punches and dies operate in grooves 81 with intermediate walls 82 in the upper portion of station housing 21. As shown in FIG. 5, the centers of adjacent grooves are exactly twice the distance apart of the character spacing on the card. Thus the punch spacing is 3.5 and 5 per inch for the seven and 10 character per inch modules.

Each module will necessarily have the same throughput rate of cards. Likewise the machine is arranged for a common print cycle time for adjacent modules. Therefore, on the module with the 10 per inch characters the credit card moves 2.00 inches in 20 character cycles, during which time a point on the card will pass 10 punches. During the same 20 cycles a credit card on the seven per inch character module will likewise pass 10 punches but will travel 2.86 linear inches in so doing.

The drive means for belts 74 are differentially geared to allow this differential speed and to compensate for this differential speed there are seven index belt fingers on the seven character per inch module belt and 10 (10) fingers on the 10 character per inch modules as shown in FIG. 4. The different finger spacing is observed in the gap between the front of the card and the leading finger.

A new development in credit cards is the punching of coded holes to allow the machine reading of these cards at sales stations with inexpensive photoelectric devices rather than the prohibitively expensive character readers. Our present machine is adaptable to this since another module can be added with coded hole punches.

OPERATION

Figure 17:
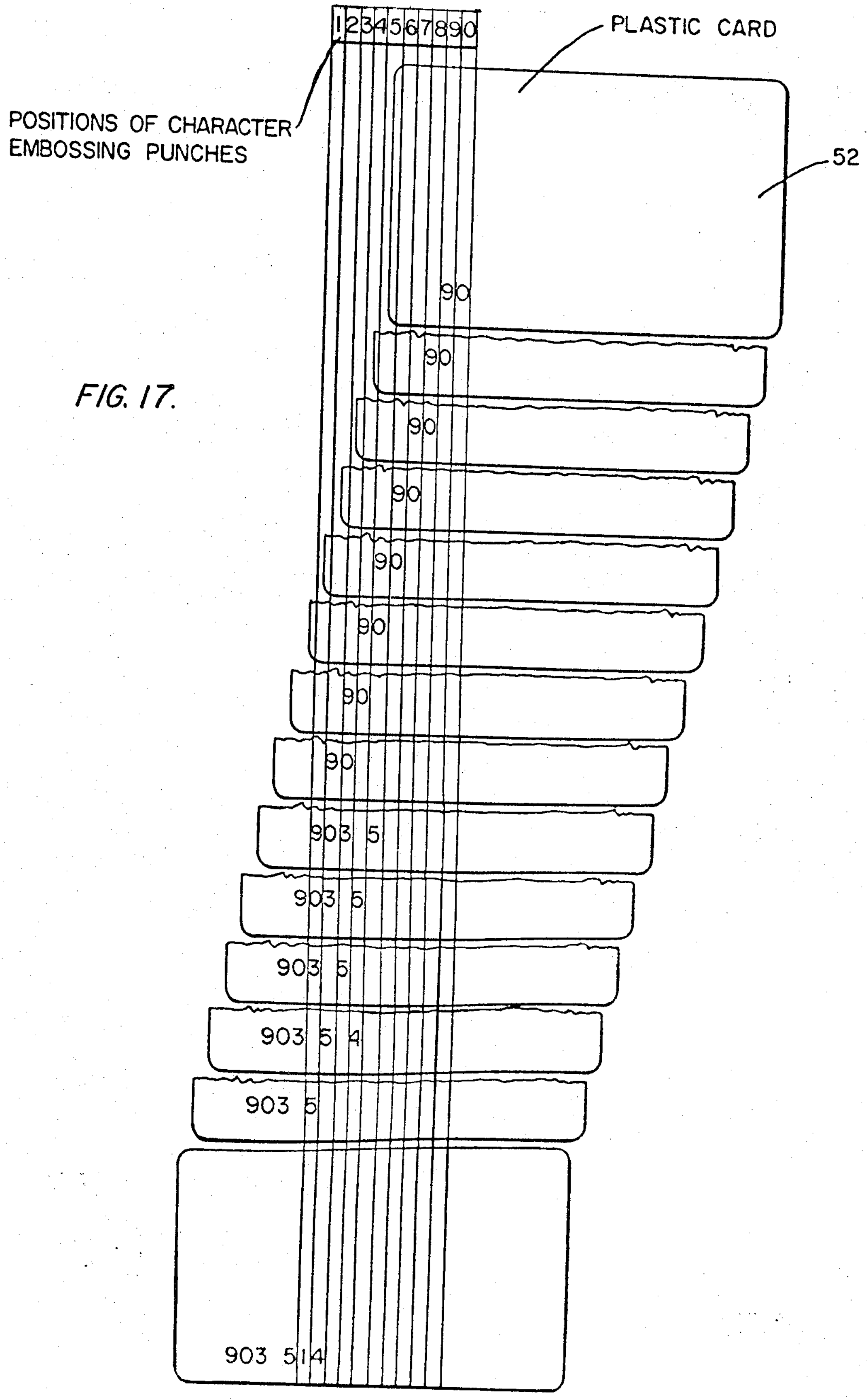
FIG. 17 is a schematic view of the embossing logic.

FIG. 17 schematically shows the sequence involved in embossing number 903514 onto a particular location on a plastic card 52. The card is moved incrementally from right to left through the machine and past the array of character embossing punches, 1, 2, 3, 4, 5, 6, 7, 8, 9 and 0. The plastic card has moved several increments to the left before it is in a position to be embossed with characters or numerals 9 and 0 simultaneously. The card then continues to move incrementally to the left eight steps when the characters 3 and 5 are embossed simultaneously. The card continues to move incrementally to the left three steps to be embossed by character 4 and continues two more steps to be embossed by character 1. Now the card has been fully embossed with the complete character group 903514 at the desired area on the card.

Figure 18:
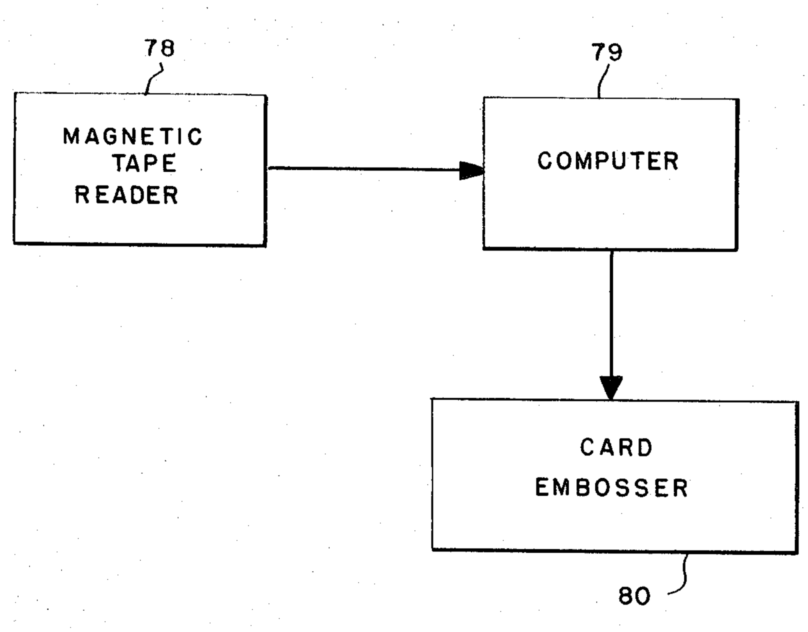
FIG. 18 is a schematic block diagram of the elements of the complete machine.

It can be seen that any group of characters, numerals or alphabetic, can be embossed on the card in a similar manner. All that is required, as shown in FIG. 18, is for a magnetic tape reader 78 or other data sensor to read the desired sequence of numbers and for a computer 79 to translate that to the proper embossing sequence as the card is indexed through the card embosser or embossing station 80. The logic in the computer is similar to the logic used to control high-speed computer printers of the drum type such as the model 4800 printer manufactured by Data Products Corporation, or the chain type such as model 1403 printer manufactured by International Business Machines, and is well known in the art. In view of this, no detailed showing is made of the card reader and computer logic which read the data input and translate that to the proper sequence of energizing the magnet coils which ultimately cause the embossing actions.

The combination of this electronic logic control with the reciprocating punches and dies allows the spacing of the punches at intervals different from the character spacing on the card. The illustrated machine uses a punch separation of exactly two characters. This separation is important in an embossing punch as opposed to a printing punch.

As best shown in FIG. 6 the die has a character-shaped cavity. If the dies are spaced apart the distance of the actual characters, then between adjacent dies there must be two character cavity walls. For a 10 character per inch die, the space between characters is less than 1/16 inch, thus limiting the wall thickness to less than 1/32 inch thickness. This construction imposes severe strength limitations. Our construction allows adjacent cavity distances of nearly 3/16, thus allowing much greater cavity wall thickness, including a beveled die face, if desired, with a much more rugged construction.

The first step in setting up the machine for embossing is to set the station housing 21 at the correct height to emboss characters at the desired level on the card. Quite frequently, two or more lines of embossed characters are required to be printed on each card. The drawings disclose a machine which embosses one level of printing at each station and when multiple levels of printing is desired the stations are connected together in tandem as shown in FIGS. 3 and 4.

The card indexing drive means advances the card one position between each embossing step in the machine cycle. The card index belts 74 of each station housing 21 pass the card from station to station by the cooperation of index belt fingers 75 of adjoining belts. Suitable input and output hoppers, not shown, inject cards onto the belts and receive and stack cards after embossing.

Any suitable means of indexing the card index belt 74 may be used. The disclosed card indexing means 70 transforms constant rotational motion into the proper indexing and dwell sequence. Input shaft 63 of card indexing gear box 62 moves continuously. This drives worm gear drive collar 66 which in turn drives barrel cam 65 and attached worm gear 64 through the means of barrel cam pin 68.

The worm gear barrel cam and worm gear are slidably mounted on input shaft 63 so that while turning at the same velocity as the shaft, they may move up and down on the shaft under the influence of barrel cam guide pin 69 and associated barrel cam groove 71. The barrel cam groove is a spiral for the majority of the circumference exactly equal to, and in the same direction as, the pitch of the threads in worm gear 64. The short remainder of the barrel cam groove is a sharply inclined spiral to join the two edges of the longer spiral.

In operation, the above elements, during the majority of a single revolution of input shaft 63, cause no rotation of worm wheel 72. Although worm gear 64 is turning during this period the barrel cam is moving linearly to exactly nullify the influence of worm gear 64 on the worm wheel 72. During the shorter period of the cycle when the linear movement of worm gear 64 and barrel cam 65 is reversed by the reversed spiral of barrel cam groove 71, both the rotational movement of worm gear 64 and the linear movement of the barrel cam and worm gear cause worm wheel 72 and output shaft 73 to make a short but rapid rotational movement.

During operation, main drive shaft 22 and therefore station drive shaft 26 are operated continuously. This causes a continuous vertical reciprocation of eccentric arm 28 and therefore a continuous and opposite partial rotation or reciprocation of bails or bail shafts 32 and 33.

The embossing operation and the indexing of the card between embossing steps include movement of both the punch and die. When the card is being embossed, the die 51 must have its die cavity 59 constantly against the card. During this embossing operation the punch 60 moves its punch tip 61 into the card and out again in a continuous motion. The die must, however, remain stationary during what is called the die dwell time to prevent movement of the card. After the embossing is complete and the punch has withdrawn, the die must also withdraw to allow the card with its embossed characters to pass in front of the die and the die cavity where the embossed portion of the character was during the embossing operation.

Figure 14:
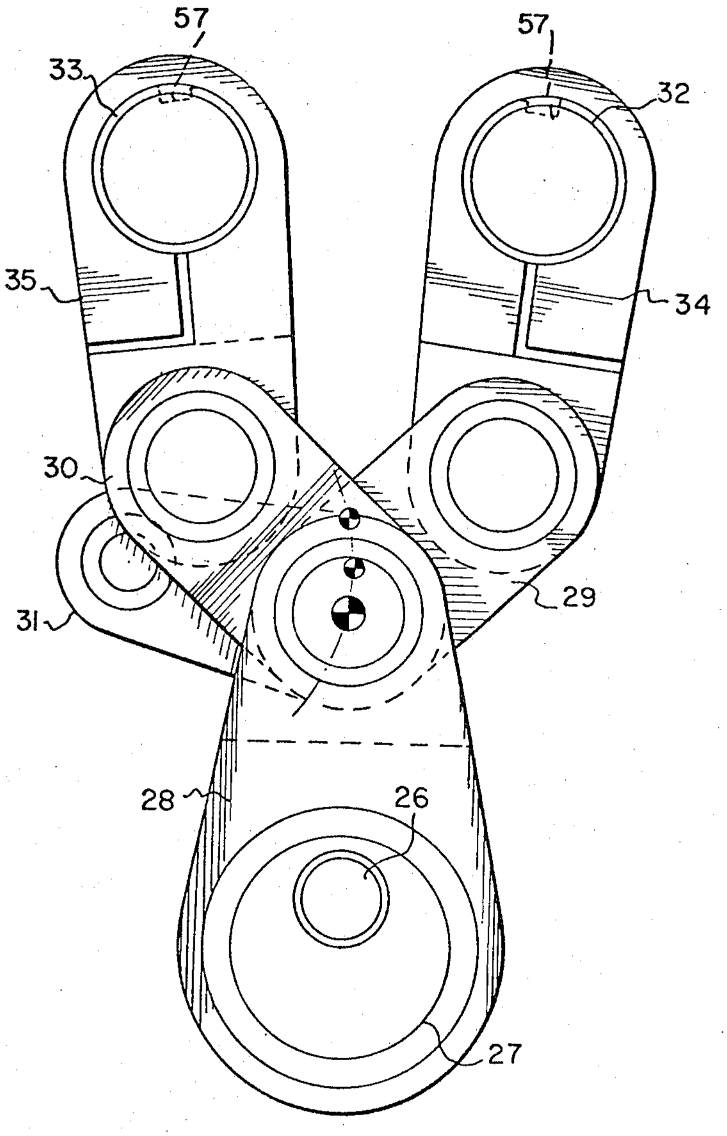
FIG. 14 is a section of the bail shaft drive at the bottom of the stroke.
Figure 15:
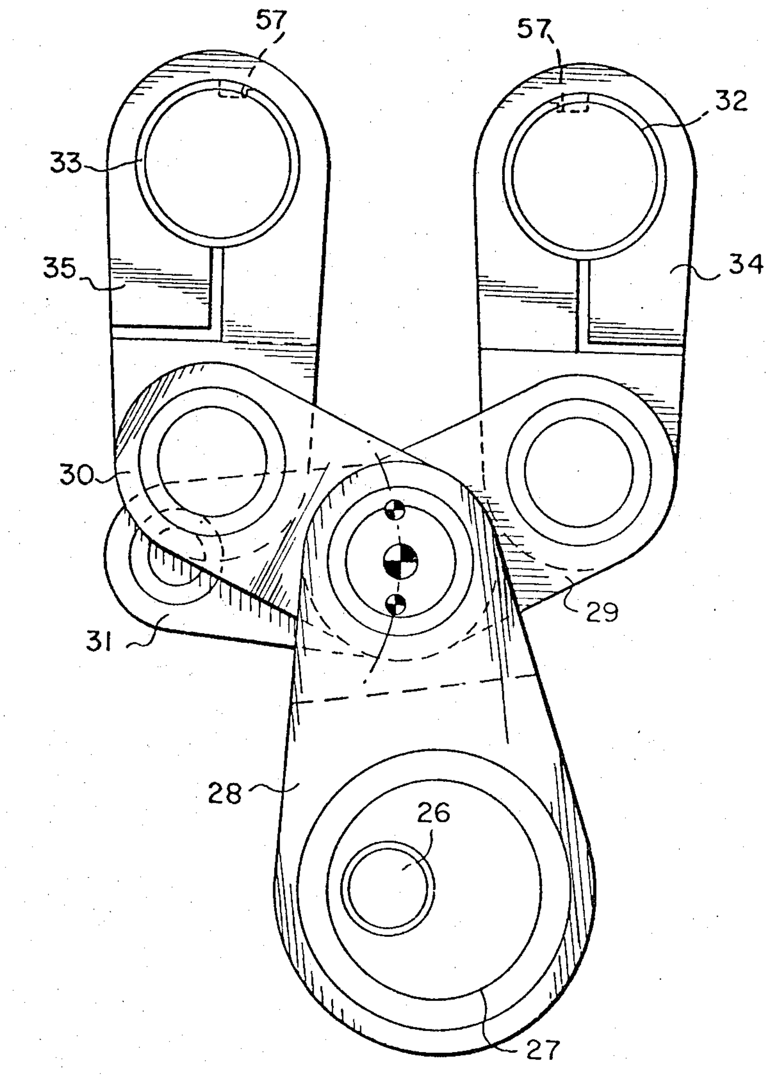
FIG. 15 is a section of the bail shaft drive at the start of the die dwell.
Figure 16:
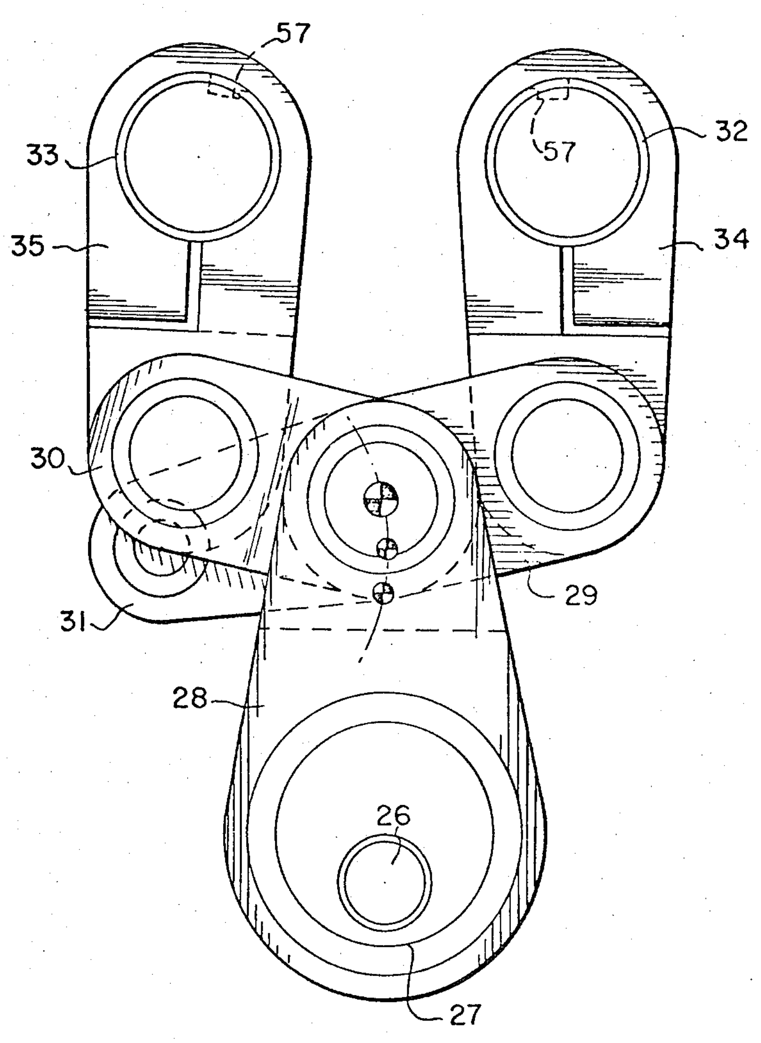
FIG. 16 is a section of the bail shaft drive at the top of the stroke.

The above mechanical operations are carried out by the proper geometrical arrangement of die drive link 29, punch drive link 30 and dwell control link 31 which is pivotally attached to station housing 21. A suitable arrangement is shown in FIGS. 14, 15 and 16.

The function of the dwell control link 31 is to impart a continuous reciprocal rotational movement to bail 33 for the punches and an interrupted reciprocal rotational movement to bail 32 for the dies. This is shown in detail in FIGS. 14, 15 and 16 where the bail shaft drive is at the bottom of the stroke in FIG. 14, at the start of the die dewll in FIG. 15, and at the top of the stroke in FIG. 16. Alternative geometric relations can also be employed so long as they result in the above desired functional relationship which allows the card to be embossed and allows the card to be indexed between embossing steps.

The arrangement of bail shafts 32 and 33 has an additional advantage. The shafts are supported along their entire operative length by the upper portion of station housing 21. The rotary motion imposes a twisting movement on the bail shafts and the load imposed by the embossers imposes as well a lateral stress. As the shaft is supported along its length, this load does not result in a lateral flexing. The load imposed is 200 pounds per character and the machine must be designed for the simultaneous embossing of all characters or, for a 42 character set, something over 4 tons.

The electrical energization of the magnet coils must, of course, be in synchronism with the movement of the bail shafts and the indexing of the card. This is accomplished by timing disc 47 on the station drive shaft 26 and sensing head 48. The sensing head detects every time the drive shaft, and therefore the bails and the card indexing belt, which are interconnected, are in a certain position.

The embossing steps will now be described with particular reference to FIGS. 7 through 11. When, for example, the input data to the machine is that the card is to be embossed with a particular character, say, numeral 4, at a particular point on the card, this particular point will be indexed past the punch and die containing numeral 4 as it will be indexed past every other punch and die at the station. When the particular point on the card is indexed past the punch and die set containing numeral 4, the computer will send a signal to the magnet assemblies 36 for the punch and die, energizing magnet coils 37 and closing armatures 38. This closing of armatures 38 lowers the interposer stops 40 thus allowing the interposers 41 to rotate under the influence of interposer springs 42.

Figure 7:
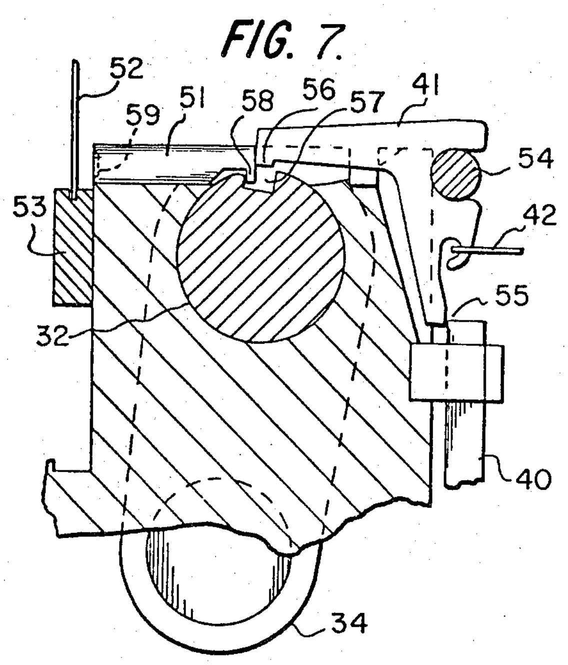
FIG. 7 is a partial section showing the die bail withdrawn, the interposer disengaged, and the die withdrawn.
Figure 8:
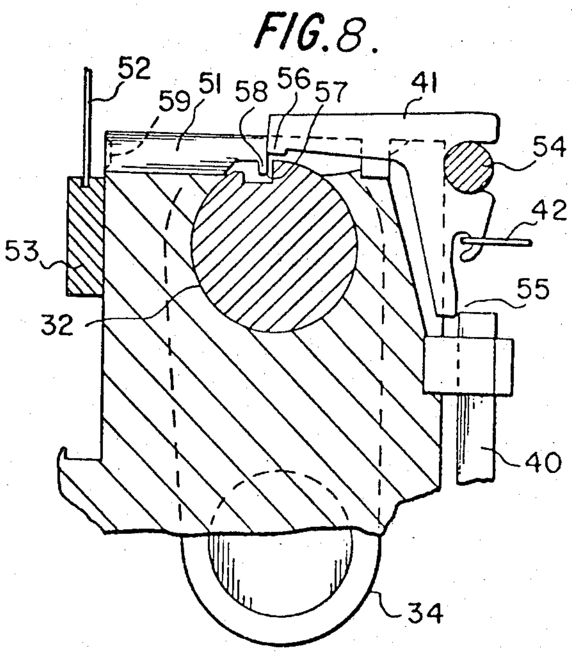
FIG. 8 is a partial section of the same die bail operated, the interposer disengaged, and the die withdrawn.
Figure 9:
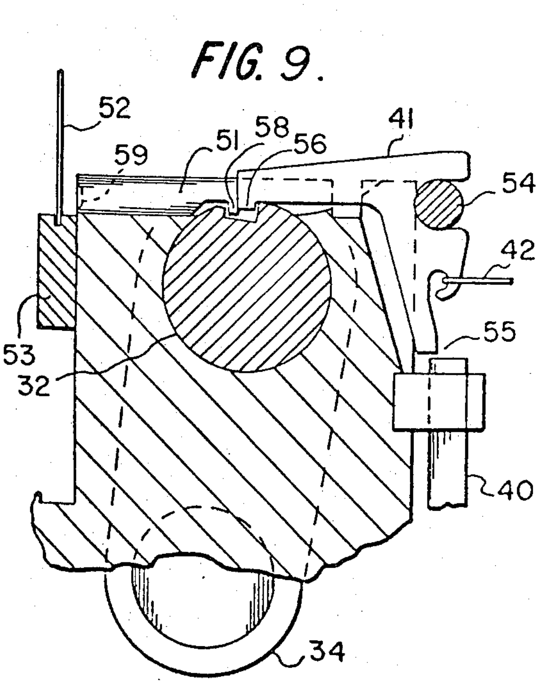
FIG. 9 is a partial section of the same die bail withdrawn, the interposer engaged, and the die withdrawn.
Figure 10:
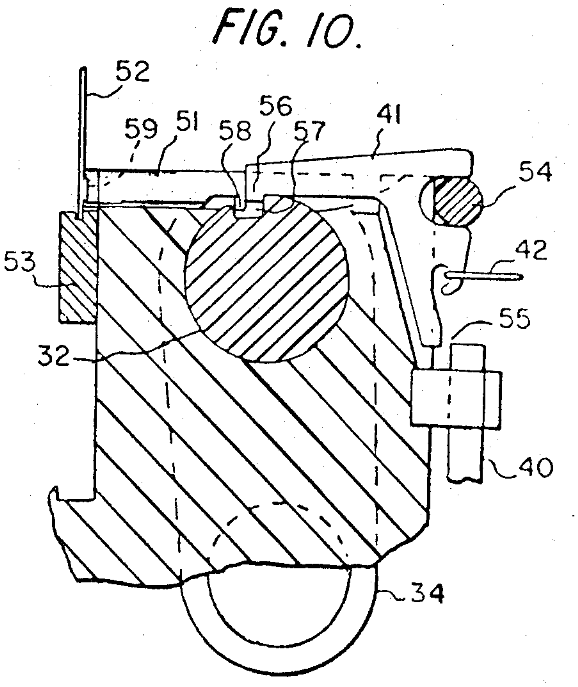
FIG. 10 is a partial section of the same die bail operated, the interposer engaged, and the die oprated.
Figure 11:
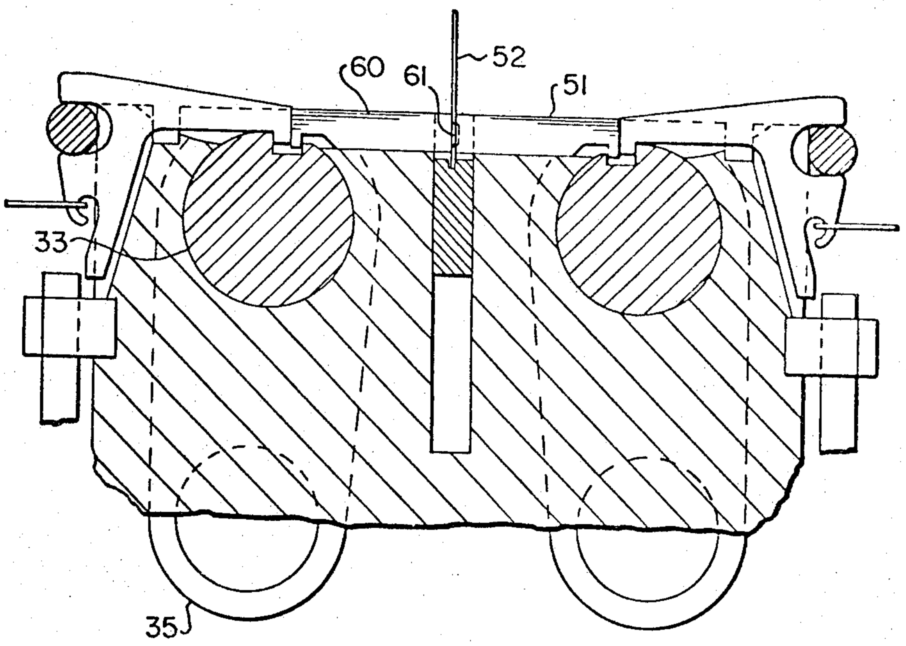
FIG. 11 is a partial section of the embosser assembly, showing both the punch and die during an embossing step.
Figure 12:
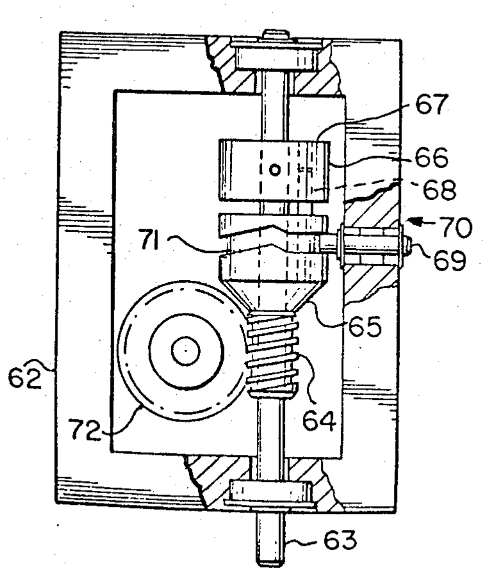
FIG. 12 is a bottom view of the card indexing gear box.
Figure 13:
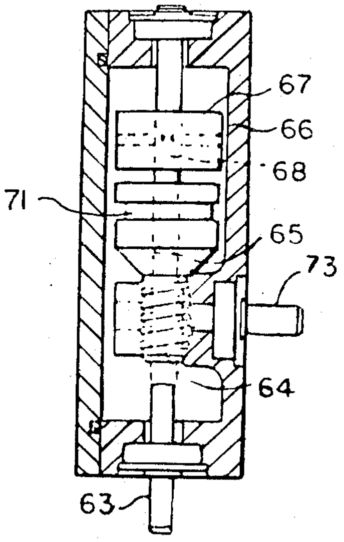
FIG. 13 is a side view of the card indexing gear box.

When the interposer stops 40 are elevated as shown in FIGS. 7 and 8 the reciprocal motion of the bail 32 keeps the die 51 in the withdrawn position and does not force it against the card when the bail is rotated into the operating position. When the interposer stop 40 is withdrawn as shown in FIG. 9 the interposer 41 rotates and the interposer tip 56 falls into bail recess 57 along with die tail 58 as the bail assumes the withdrawn position. When the bail is rotated to the operating position as shown in FIG. 6 the interposer tip 56 forces the die against the card. The cooperating interposer for the punch similarly forces the punch against the die as shown in FIG. 11. During this portion of the cycle the interposer stops are again raised as shown in FIG. 11 and as the bail reciprocates back to the withdrawn position the interposer will be rotated slightly withdrawing the interposer tip from the bail recess. The embossing operation has now been complete and the card may be indexed one character position.

The punch activating mechanism shown has in effect a short mechanical memory. The electronic signal can be of very short duration and does not need to be continuous during the entire punching cycle. The signal energizes the interposer stop releasing it. The interposer thus drops into the bail under the force of its spring and is held there during the cycle by the force of the bail and punch or die.

Switch elements 43 and 44 operate during a punching cycle. An electrical circuit from the computer to element 43 and from 44 back (not shown) is closed when interposer spring 42 and hook 82 are pulled against element 44. This signal is an error check, confirming that the intended embossing operation has taken place.

As shown in FIG. 14 the numbers are not all embossed on the card in the sequence of their location. During any one indexing cycle there may be no embossing actions or there may be several embossing actions, depending on the particular numbers desired to be embossed on the card and the location of those characters at the station housing.

As shown in my earlier application, the dies may be stationary and the punches alone may be selectively moved under the influence of a common reciprocating shaft and magnet controlled interposers during each index cycle.

The gist of the present invention is transforming the embossing instructions by electronic logic in order to simplify the mechanisms for embossing. Other means for transforming the instructions to operate the punches and dies in the desired sequences are readily apparent.

I claim:

1. In a credit card embossing machine the combination comprising a. a station housing having a font of selectively operable punch and die pairs, b. for each of said punch and die pairs, a pair of cooperating interposers, c. a pair of bail shafts, the first shaft cooperating with the punches and associated interposers of said punch and die pairs and the second shaft cooperating with the dies and associated interposers of said punch and die pairs, d. drive means for imparting continuous movement to each of the bail shafts, e. each of said bail shafts having a generally circular cross section, f. means in said station housing for supporting each of said bail shafts along its entire operative length against lateral movement, g. said drive means imparting a continuous partial reciprocatory rotational movement to each of said bail shafts, h. cooperative means on said respective bail shafts between said interposer and said punch and die to selectively transmit the continous motion of the bail shafts into a selective embossing motion of the punch and die pairs.

* * * * *